J. BAILEY.
MACHINE FOR FINISHING BLOWN GLASS ARTICLES.
APPLICATION FILED AUG. 19, 1919.

1,352,396.

Patented Sept. 7, 1920.
9 SHEETS—SHEET 1.

Inventor
James Bailey
By [signature]
Attorney

J. BAILEY.
MACHINE FOR FINISHING BLOWN GLASS ARTICLES.
APPLICATION FILED AUG. 19, 1919.

1,352,396.

Patented Sept. 7, 1920.
9 SHEETS—SHEET 2.

Inventor
James Bailey
By
Attorney

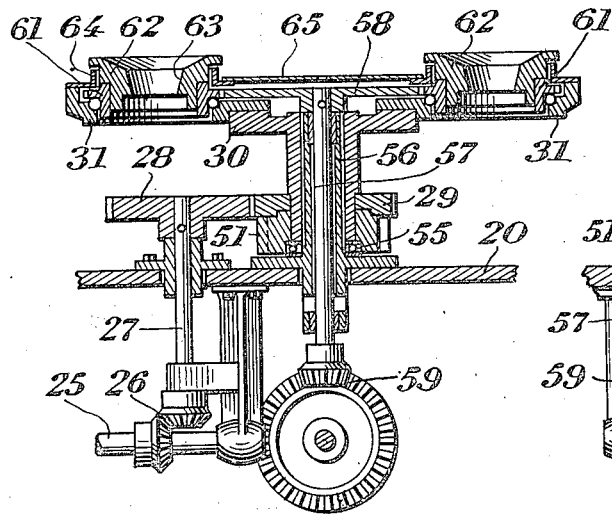
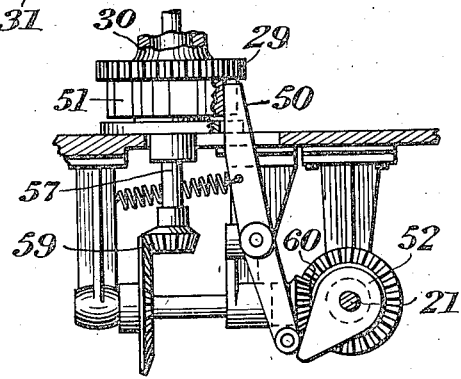
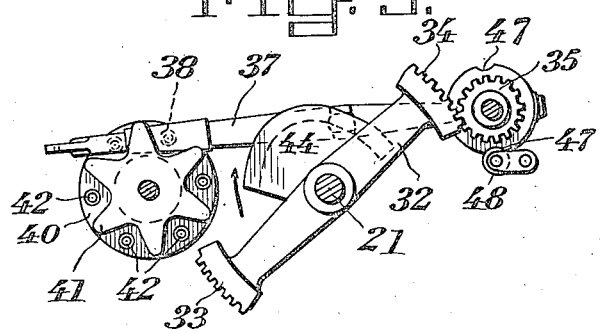
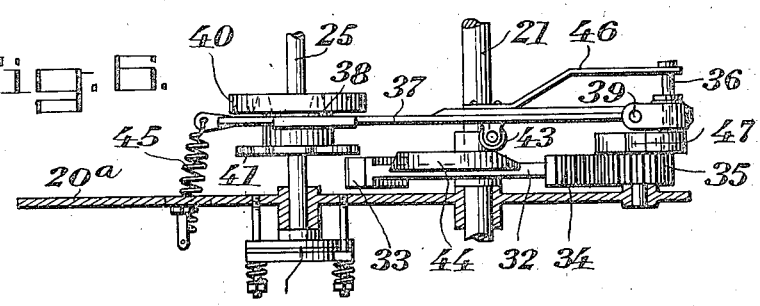

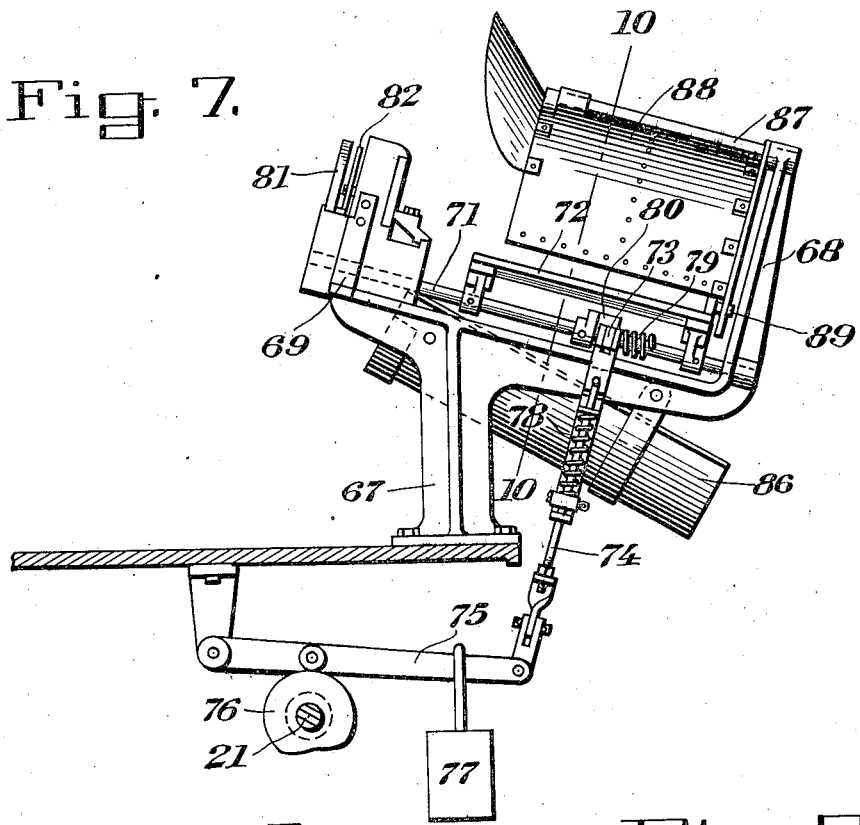
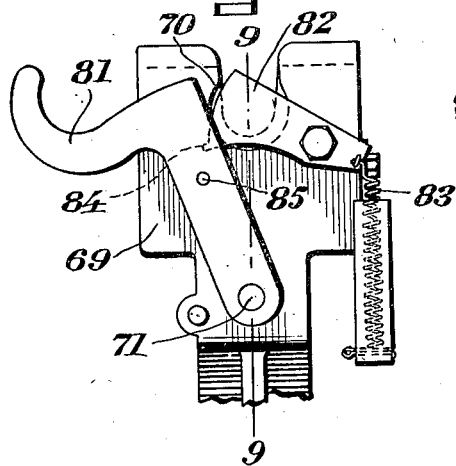
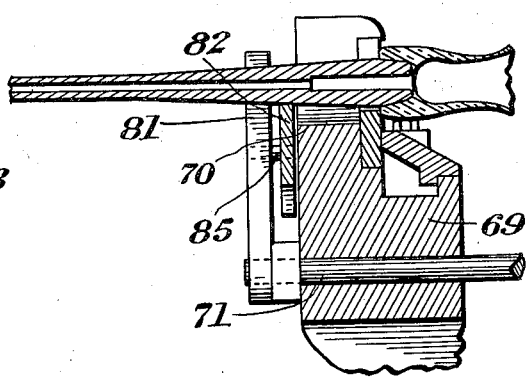

J. BAILEY.
MACHINE FOR FINISHING BLOWN GLASS ARTICLES.
APPLICATION FILED AUG. 19, 1919.

1,352,396.

Patented Sept. 7, 1920.
9 SHEETS—SHEET 5.

Inventor
James Bailey
By [signature]
Attorney

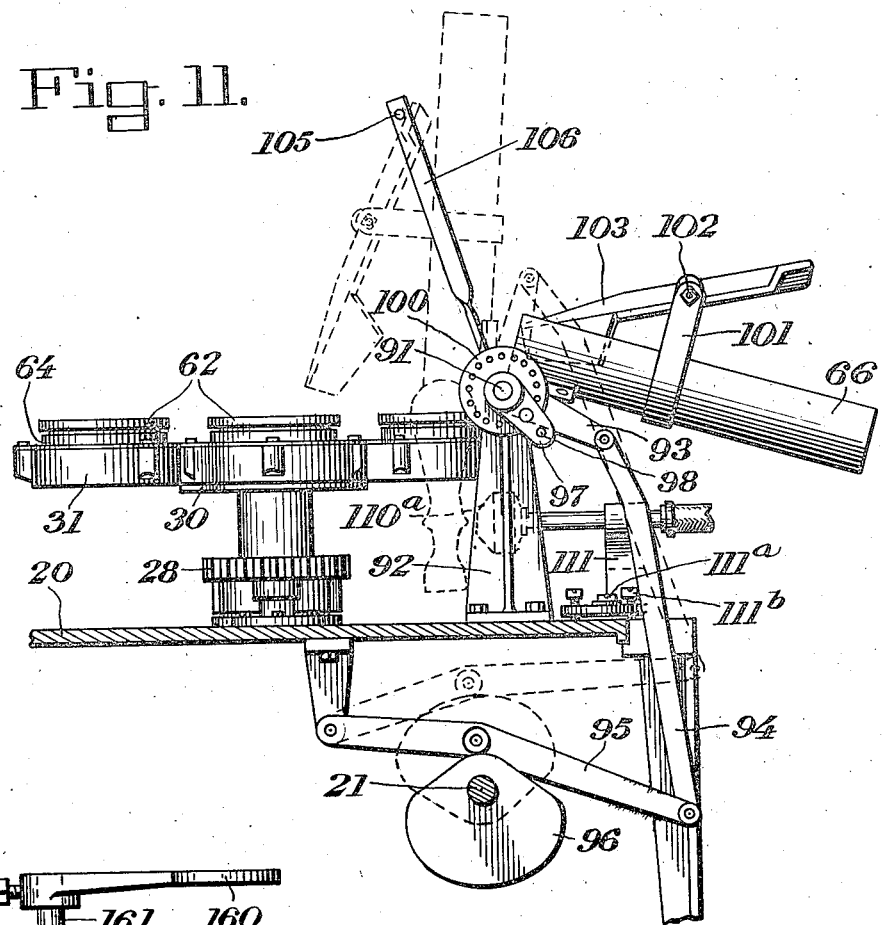
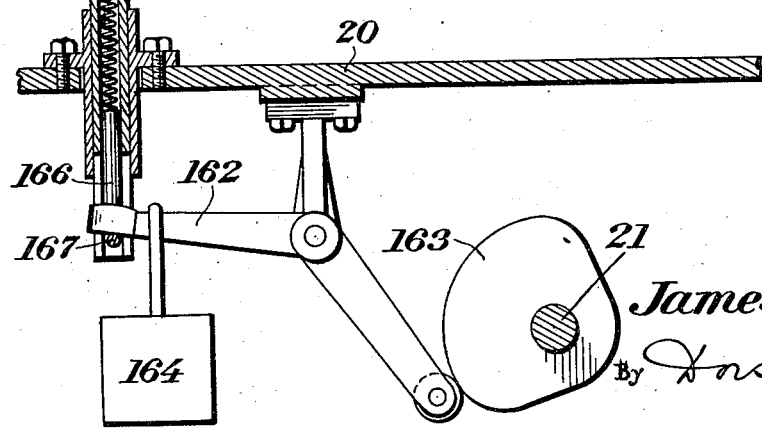

J. BAILEY.
MACHINE FOR FINISHING BLOWN GLASS ARTICLES.
APPLICATION FILED AUG. 19, 1919.
1,352,396.
Patented Sept. 7, 1920.
9 SHEETS—SHEET 7.
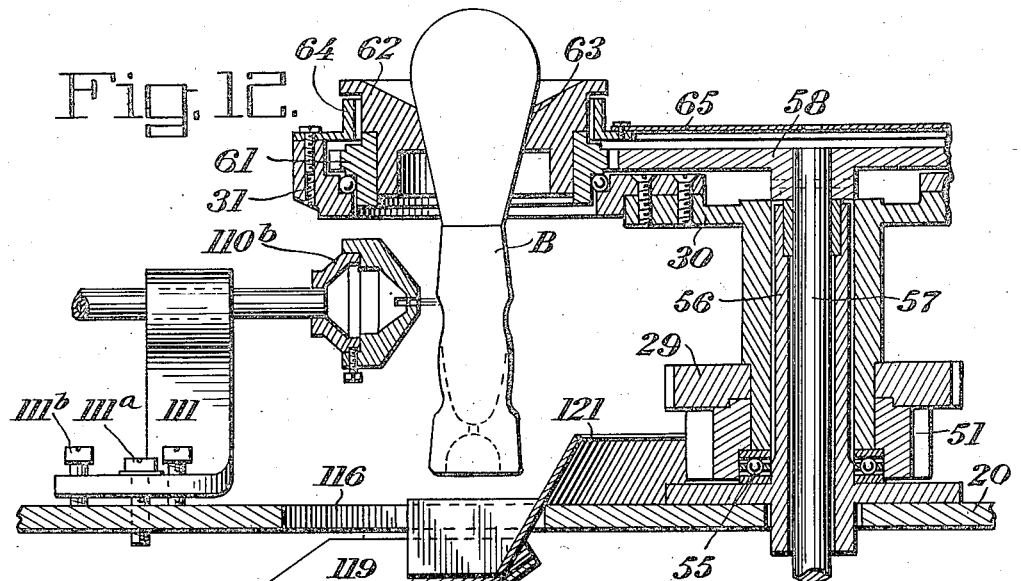
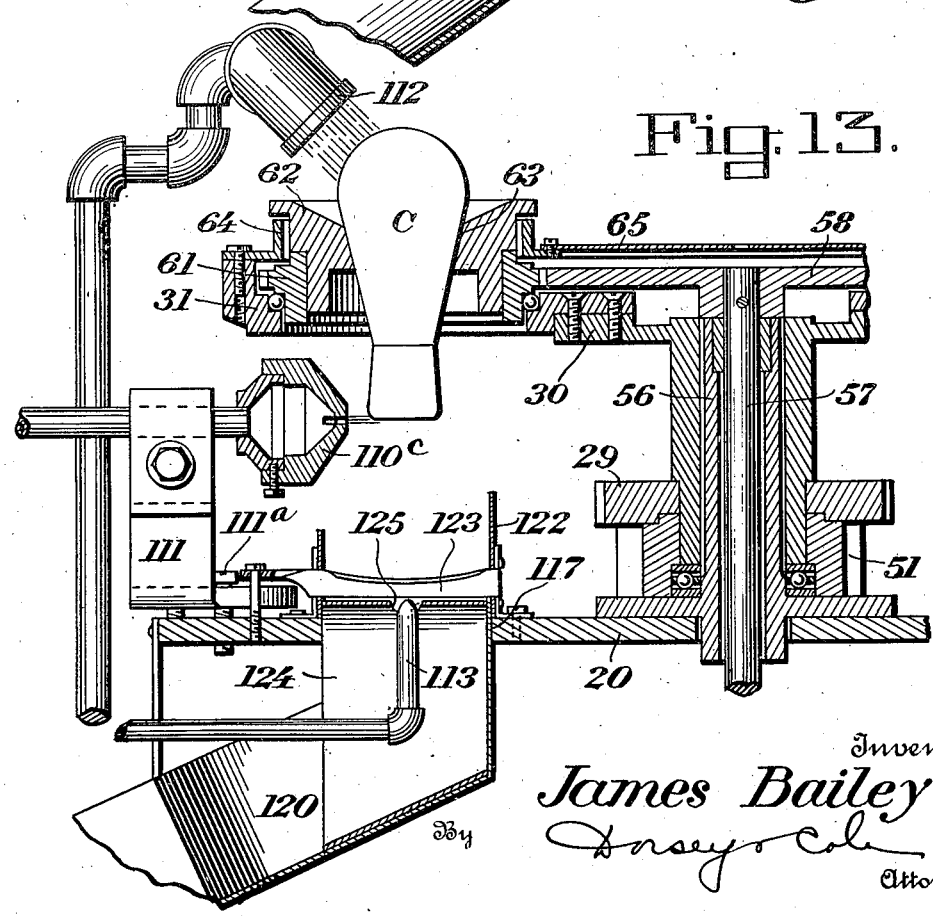
Inventor
James Bailey
By Dorsey Cole
Attorney

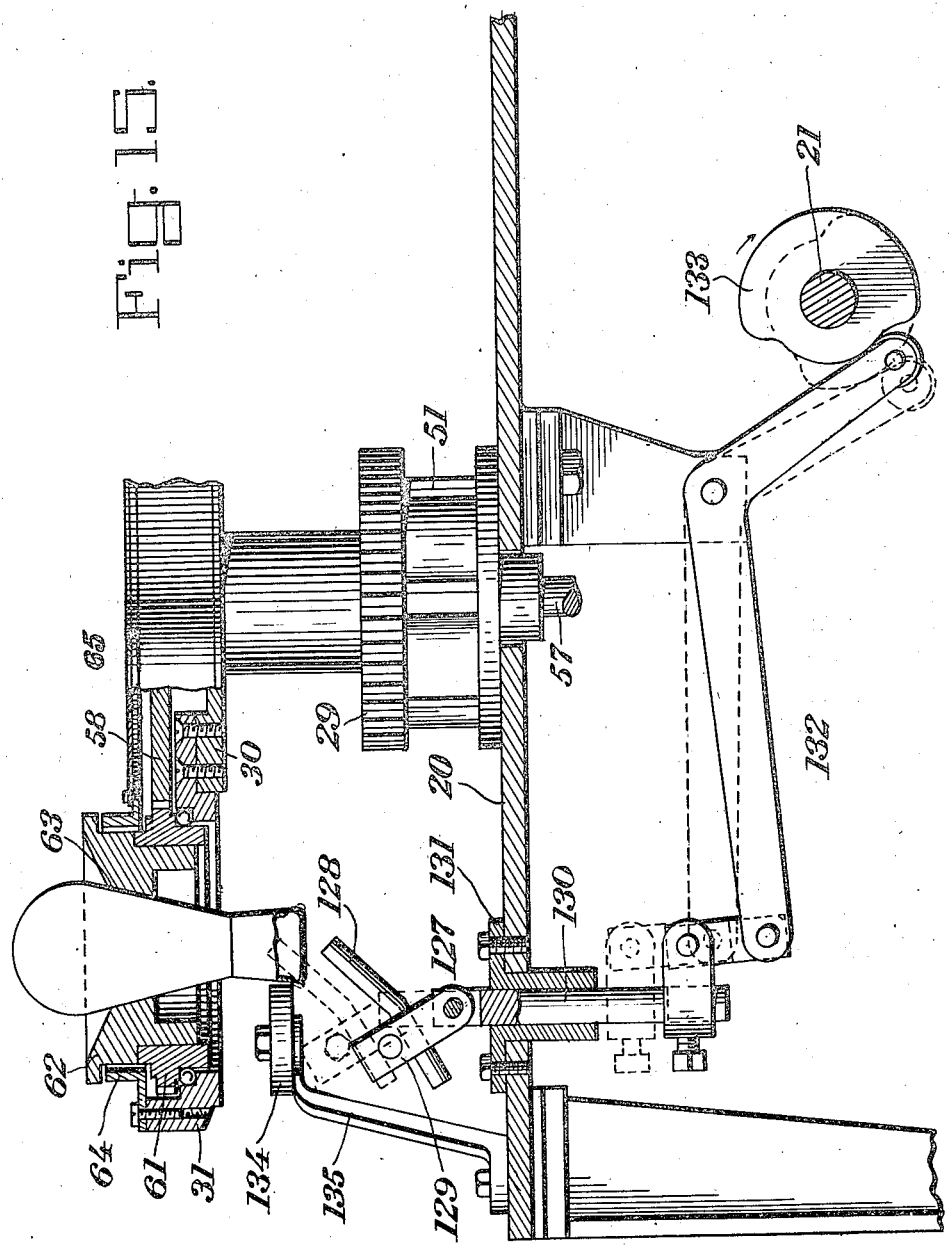

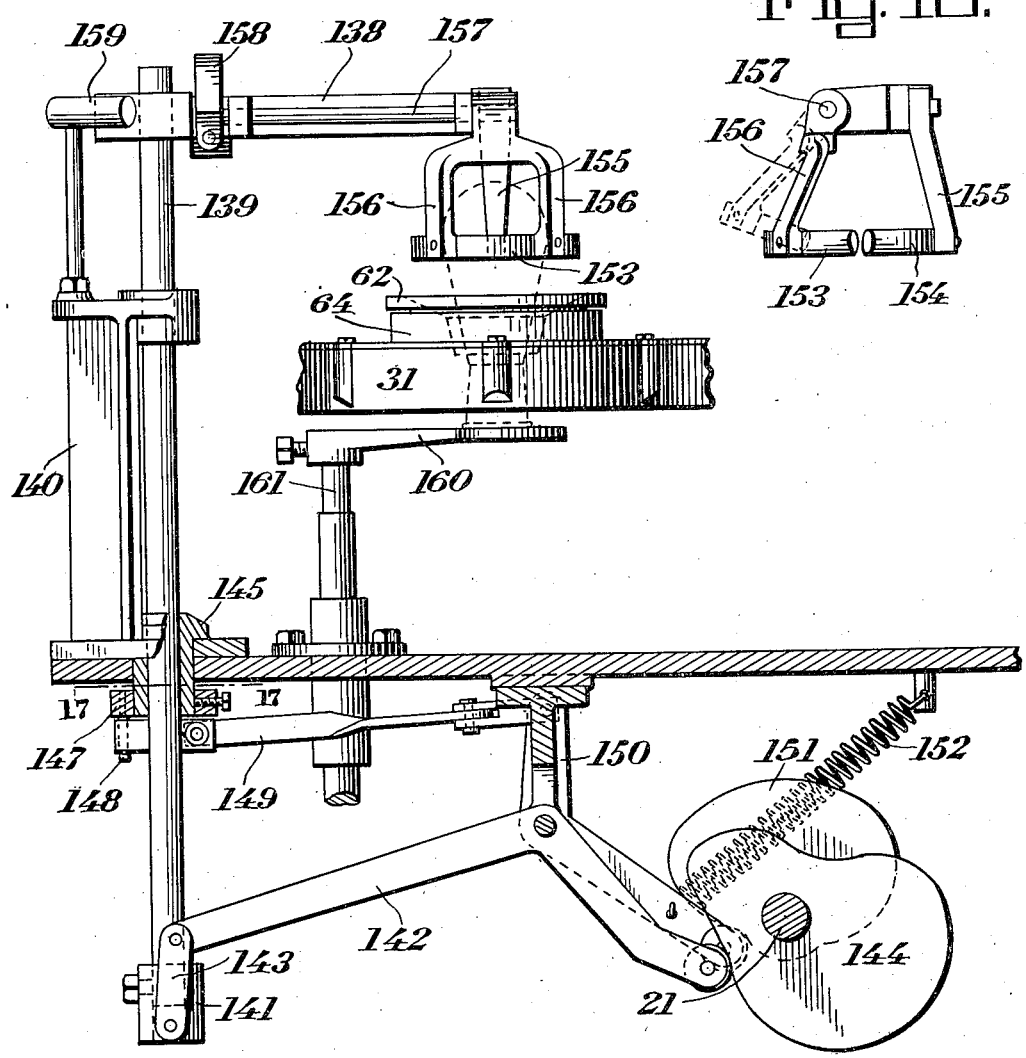

UNITED STATES PATENT OFFICE.

JAMES BAILEY, OF CORNING, NEW YORK, ASSIGNOR TO CORNING GLASS WORKS, OF CORNING, NEW YORK, A CORPORATION OF NEW YORK.

MACHINE FOR FINISHING BLOWN-GLASS ARTICLES.

1,352,396.

Specification of Letters Patent.  Patented Sept. 7, 1920.

Application filed August 19, 1919. Serial No. 318,569.

*To all whom it may concern:*

Be it known that I, JAMES BAILEY, a citizen of the United States of America, and a resident of the city of Corning, county of Steuben, and State of New York, have invented certain new and useful Improvements in Machines for Finishing Blown-Glass Articles, of which the following is a specification.

This invention relates to a machine by which a blown glass article having a comparatively thin wall, of which it is desired to remove certain excess portions, is finished. The particular machine shown herein is one adapted to remove the moil end of an electric lamp bulb after the same has been blown.

The device shown in this application has for its object to provide a means by which such unnecessary portion may be rapidly and economically removed and the bulb properly prepared for subsequent fabrication. In its most complete form the invention contemplates means for stripping a bulb blown on a blow-iron from such iron, the moil also being removed and left adherent to the neck of the bulb, and for feeding such a bulb with the adherent moil to a turret by which the bulb is carried past proper devices (also forming a part of this invention) to effect the cutting off of the undesired portions, and to prepare the bulb for fabrication into a lamp. It further contemplates in its most complete form means for removing the bulb from the turret at a desired point.

The invention consists in the construction, arrangement and combination of the several parts of which it is composed, as will be hereinafter more fully described and claimed.

Referring to the accompanying drawings, wherein is illustrated the preferred embodiment of the invention:—

Fig. 3, is a fragmental transverse vertical section, showing the turret operating and bulb rotating mechanism;

Fig. 4 is a view similar to Fig. 3, but at right angles thereto, showing the turret locking mechanism;

Fig. 5, is a vertical section taken on the line 5—5, of Fig. 2, showing the intermittent drive for rotating the turret;

Fig. 6, is a plan of the mechanism shown in Fig. 5;

Fig. 7, is a view in side elevation of the bulb stripper, the receiving tray therefor, and actuating mechanism for the latter;

Fig. 8, is a detail front view of the stripper showing the locking mechanism therefor;

Fig. 9, is a fragmental section taken on the line 9—9, of Fig. 8, illustrating the stripping action;

Fig. 11, is a side elevation of the loading mechanism and associated parts at station I, illustrating by dotted lines a bulb being delivered into the turret;

Fig. 12, is a detail sectional view taken on the line 12—12, of Fig. 1, at station II, with a bulb in the turret.

Fig. 13, is a view similar to Fig. 12, taken on the line 13—13, of Fig. 1, at station III showing a bulb after the moil has dropped off;

Fig. 15, is a detail section taken at station IV, showing the mechanism for flaring the neck of the bulb;

Fig. 16, is a detail view taken adjacent station VI, showing the mechanism for removing the bulb from the turret;

Fig. 17, is a horizontal section taken on the line 17—17, of Fig. 16;

Fig. 18, is a detail view of the bulb gripper;

Fig. 19, is a view showing the bulb lifting mechanism located at station VI, coöperating with the mechanism illustrated in Figs. 16, 17 and 18.

Figure 1:
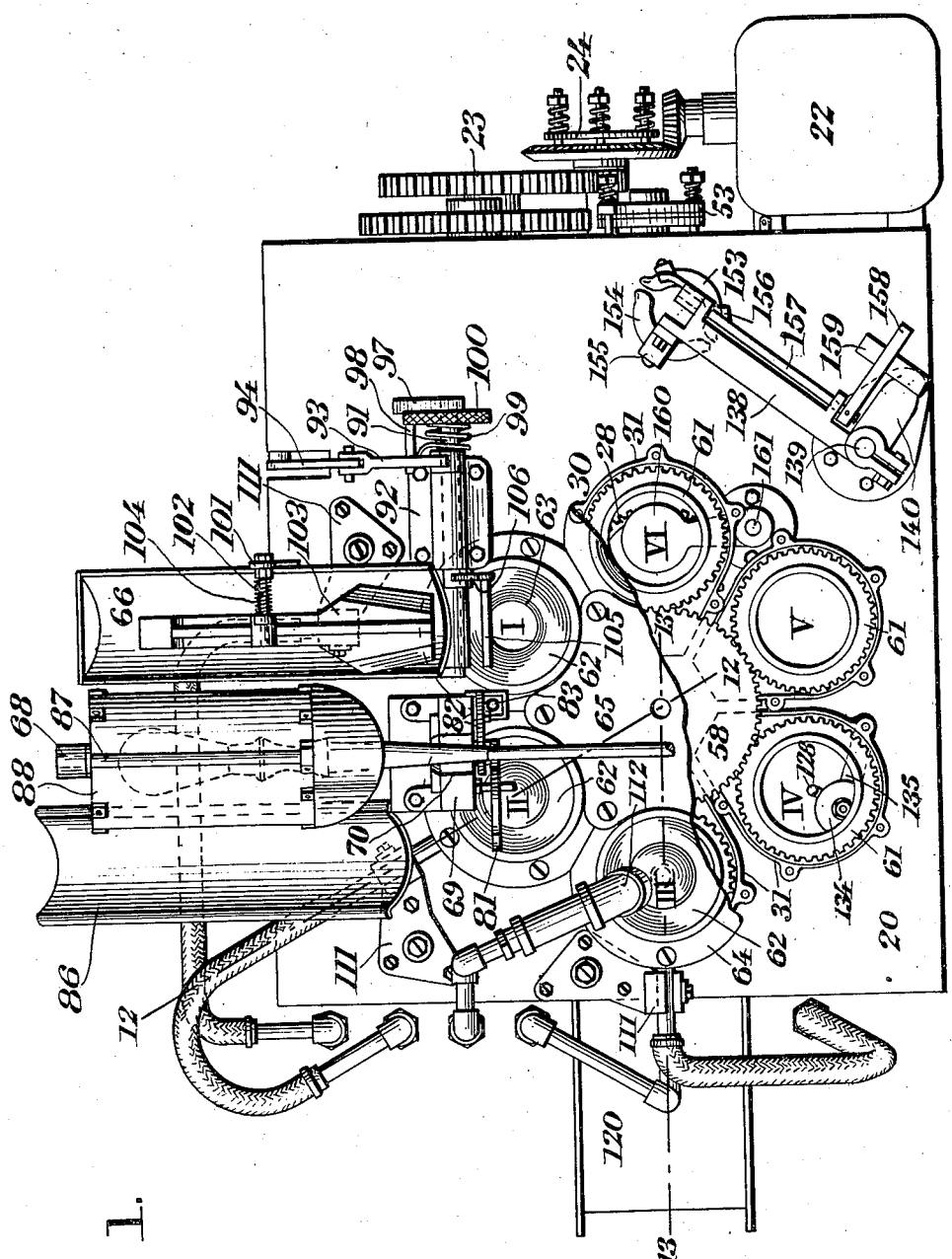
Figure 1, is a plan view of the machine showing a blow iron in position for delivering a bulb thereto, parts being broken away to illustrate the underlying structure.
Figure 2:
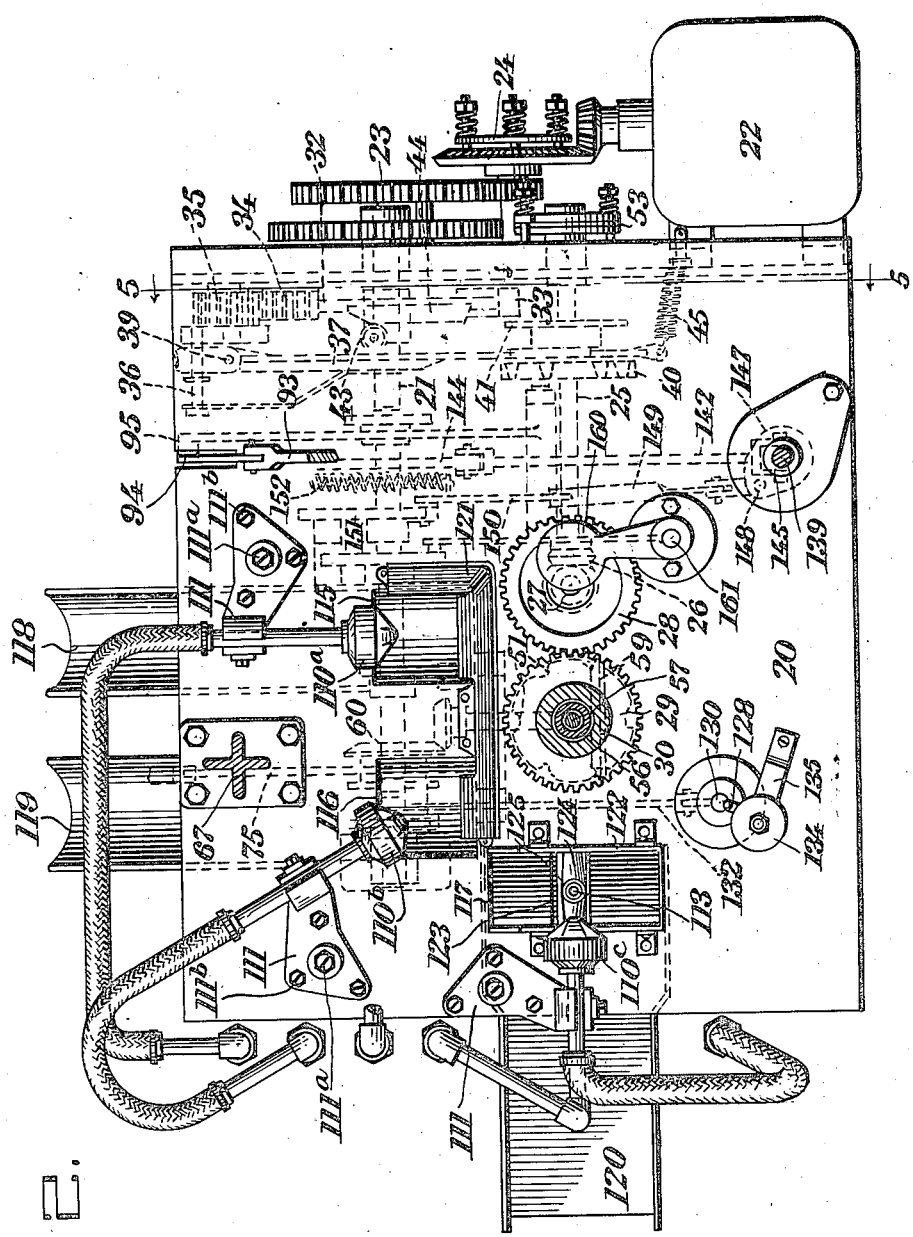
Fig. 2, is a view similar to Fig. 1, but with certain portions of the machine removed, and showing by dotted lines the parts located beneath the table.
Figure 10:
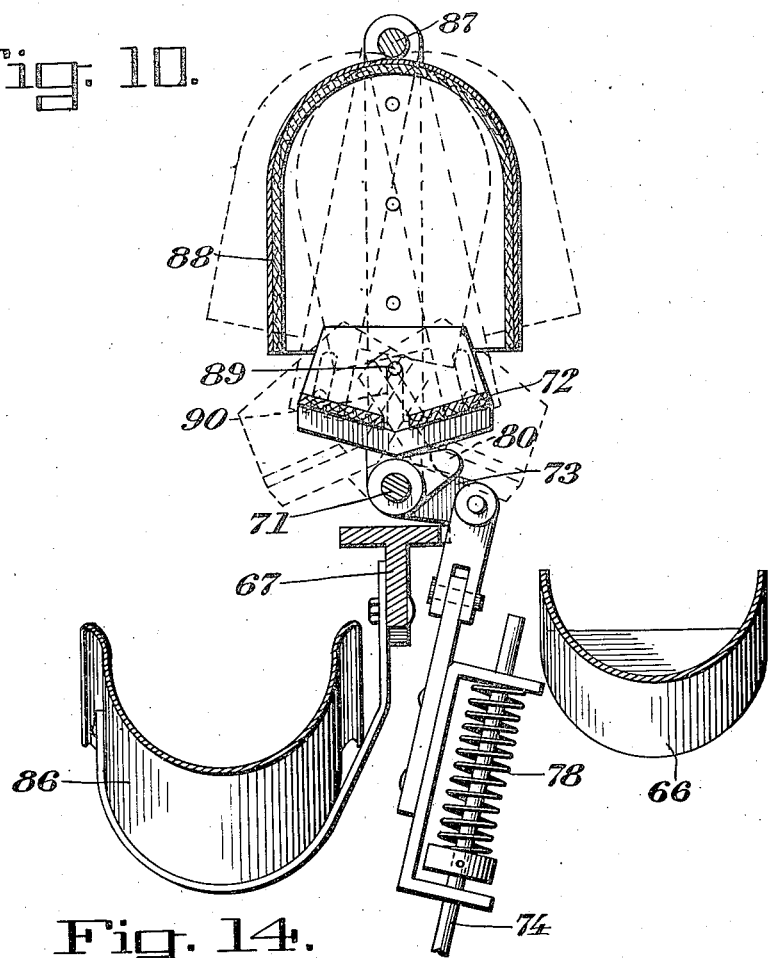
Fig. 10, is a transverse section taken on the line 10—10, of Fig. 7, illustrating the relation of the tray to the reject chute and the loader chute, and showing by dotted lines the position of the tray, when a bulb is discharged into the reject chute and into the loader chute.

The machine shown consists of several instrumentalities adapted to successively operate in and in connection with a bulb, such instrumentalities comprising means for stripping the bulb from a blow-iron, a revolving turret, means for loading the bulb into the turret, means for severing the moil from the body of the bulb while in the turret, means for flaring the neck of the bulb after the moil has been removed, and means for transferring the bulb from the turret when the above described operations are completed.

The several instrumentalities above named are supported by and from a table of suitable height. The driving mechanism for the above instrumentalities are arranged so far as possible below the top of the table. Included in the drive mechanism is the main drive shaft 21, supported below the top 20 of the table, and driven by a motor 22 by means of a gear train 23 carried by an end plate 20ª of the table, and through a friction clutch 24, all of approved construction.

*The bulb turret and driving mechanism therefor.* (Figs. 1 to 6, inclusive.)

A counter shaft 25 is also mounted below the table top parallel with and in front of the shaft 21, and drives through miter-gears 26, a vertical shaft 27, having thereon, above the table top, a gear 28, meshing with a gear 29, on the lower end of the hub of the turret 30, carrying a plurality (in the present instance, six) bulb-holding heads 31.

Keyed on the shaft 21, adjacent to the end plate of the table is an arm 32, having on its ends rack-sectors 33 and 34; and mounted on a stud projecting from the end plate is a pinion 35, adapted to be intermittently driven by such rack-sectors in the rotation of the shaft 21. The pinion carries a crank pin 36, on which is slidably mounted one end of a pawl 37, the free end of which is provided with a tapered pin 38, projecting from one side thereof. The pawl, which is made in two parts pivoted together at 39, overlies the shafts 21 and 25, and extends between a disk 40, and a wheel 41, both carried on the last named shaft. The disk is provided, in the instant case, with six holes 42, each of which is adapted to receive the pin 38. The pawl carries on one of its sides above the shaft 21, a roller 43. A cam track 44 is formed upon a segment attached to and forming a part of the arm 32. A coil spring 45, tends to draw the free end of the pawl 37, against the wheel 41, and to thus disengage the pin from the holes in the disk 40, while the cam-track 44, acting through the roller 43, tends to move the pawl in the opposite direction, the arrangement being such that the cam-track is operated for this purpose only on a forward movement of the pawl.

The pitch diameters of the rack-sectors 33 and 34, and their lengths, and the pitch-diameter of the pinion 35, are such that the pinion will be given a complete rotation on a full rotation of the main shaft 21, although, as will be hereinafter described, this movement of the pinion 35, will be intermittent, and be with pause, while the rotation of the shaft 21, will, as stated, be continuous. The throw of the pawl 37, effected by a half rotation of the pinion is such, that if the pin thereon is in engagement with a hole in the disk 40, such disk and the shaft 25, will be rotated in the instant case, through 60° of arc. To prevent overthrow of the pinion 35, notches 47 are formed in the periphery of the pinion, and in these notches a spring-pressed braking roller 48 is adapted to engage.

Assuming that the shaft 21, is continuously driven in the operation of the device here described, and that the parts are in the position shown in Figs. 5 and 6, in which the rack-sector 34 is just engaging the pinion 35, and in which the pin 38 is held in one of the holes in the disk 40, by reason of the cam-track 44 engaging the roller 43, the further rotation of the shaft 21 in the direction of the arrow, will turn the pinion 35 through an arc of 180°, the braking roller 48 entering one of the notches 47 at the end of such movement. During this movement, the pawl 37 will be projected forwardly, turning the shaft 25 through 60° of arc. At the completion of this movement the rack-sector 34 will go out of mesh with the pinion 35, while the cam track 44 will be moved away from the roller 43, permitting the spring 45, to withdraw the pin 38 from the hole in the disk, the wheel 41 acting as a stop for this lateral movement of the pawl. Continued rotation of the shaft 21 now causes the rack-sector 33, to mesh with the pinion 35, which will be then given a further movement through 180°, retracting the pawl 37, which at this time, is not in engagement with the disk. After the sector 33 has passed out of mesh with the pinion, the latter is held locked from free movement by the roller 48, and as the shaft 21, completes its rotation the cam 44, engages the roller 43, and laterally shifts the pawl 37, to cause the pin thereon to enter the hole in the disk 40 following the one which is previously engaged, thus restoring the parts to the position shown, but with an advanced movement of the shaft 25 through 60°. If, however, as just described the pin 38 does not mesh properly with the next hole in the disk 40, so that the cam 44 by engaging the roller 43 may move the free end of the pawl laterally, the opposite end of the pawl will slide laterally upon the wrist pin, thereby flexing a leaf spring 46, carried by the pawl and engaging the head of the wrist pin. The forward motion of the pawl will then cause the pin 38 on the free end thereof to move above the face of disk 40 until it registers with the next hole in the disk, which it will then enter under the pressure exerted by the spring 46.

For the purpose of preventing over-running of the turret, a latch mechanism is provided. This, which is shown in Fig. 4, comprises a suitably mounted spring-pressed detent 50, adapted to successively engage notches 51 on the bottom of the hub of the turret 30, the detent being adapted to release the turret at a proper time by means of cam 52 fast on shaft 21. The notches are properly located to be engaged by the detent when the bulb-holding heads of the turret are at several positions, hereinafter designated as stations I to VI, inclusive. Cooperating with the latch mechanism just described, and suitably secured to one end of the shaft 25, and also connected to the end plate of the table 20, is a friction brake 53, which resists rotary movement of the shaft 25 and of the turret, and thus decreases the impact of the latter against the detent. The hub of the turret is hollow and a hollow standard 56 mounted upon the table top extends the entire length of the hub, a suitable bearing 55 being located below the hub. Supported by suitable bearings placed at each end of the hollow standard 56 is a vertical shaft 57, which at its upper end carries a gear 58, and which is continuously driven from the main shaft 21, by the bevel gears 59 and 60.

The bulb holding heads 31 are suitably mounted in the turret and at equi-distant points therearound, and each is provided with a tubular pinion 61 meshing with the gear 58, and continuously rotated thereby, the pinion having a central opening for the reception of a suitably removable tubular chuck 62. The chucks may be of proper size and shape to support the bulbs to be finished by the machine. As it is desired to remove the moil from the lower end of the neck of the bulb, while the bulb is in the turret, the means for removing the moil is positioned between the top of the table and the turret. In view of this fact, it is important that the bulb be carried by the chucks at a uniform distance from the top of the table. In the accompanying drawings the chucks shown are of the correct design to properly carry the bulb of the type shown, and as such bulb has its side walls formed by a section of a cone, it has been found desirable to make the central bore 63 of each chuck as a cone of proper diameter to engage with the walls of the bulb to support the same at the proper distance from the top of the table. Above such conical bore each chuck has its upper surface beveled outwardly and upwardly, so that if during the operation of the machine a bulb should break, the resultant particles of glass will be led to and fall through the central bore.

To prevent particles of glass from clogging the teeth of the gearing on top of the turret there is provided a cover plate therefor. This cover-plate is composed of segments 64 covering the gears 61 and having flared inner walls which encircle the constantly revolving chucks; and a central plate 65 covering the gear 59. By preference the segmental plates 64 are suitably secured by means of screws passed into bosses formed on the bulb-holding heads 31.

Mechanism has thus been described for holding bulbs and progressively moving them from station to station with a suitable period of arrest at each station, and with the bulbs continuously rotating around their own axes.

*Bulb stripping and loading.* (See Figs. 7, 8, 9, 10, and 11.)

Located above the table and to the rear of station I, of the turret, is the loader chute 66 adapted to receive bulbs from a stripper mechanism located to the left thereof. Forming a part of the stripper mechanism is a bracket 67, arising from the table, and having a bifurcated upper end, the rear member 68 of which is longer than the front member 69. The latter member is notched as at 70, so that if a suitable blow-pipe is inserted in such notch from the front, and is then pulled out (see Fig. 9), the moil of a bulb thereon will be engaged by the jaws of the notch and such moil, with bulb, be stripped from the blow-pipe.

Mounted in the bifurcated head of the standard, and below the notch 70, is a longitudinal rock shaft 71, this shaft being inclined downwardly and rearwardly and carrying a tray 72, between the forks of the standard. Sleeved on the shaft 71, is a rocker arm 73 connected by the pitman 74, with a lever 75 pivoted beneath the table top and normally held in contact with a cam 76 fast on the shaft 21, by a weight 77; the pitman having a compressible spring element 78 therein, so that the lever 75 may be lifted by the cam under certain conditions as will be hereinafter described, without lifting the rocker-arm 73. A spiral spring 79 has one end fast to the shaft and the other end bearing on the rocker arm 73, and tends to hold the lug 80, projecting from the shaft, in contact with the rocker arm.

The forward end of the shaft 71, projects through the front member 69 of the bracket, and has fast thereon a hook 81, the normal position of which is, as shown in Fig. 8, to one side of the notch 70, but which is moved across such notch when the arm 73 is pulled downwardly by the weight 77, motion at this time being imparted to the shaft through the spring.

Pivoted to the front member 69 of the bracket and on that side of the notch opposite to the hook 81, is a latch 82, which is normally held by means of a spring 83 as shown in Fig. 8, in a position in which its free end is across the notch. The end of the latch is, throughout its greater portion arcuate in form, the center of the arc being at the pivotal point, and a finger 84 is provided at the lower corner of such arcuate face. The hook 81 is provided on its rear face with a pin 85. When a blow-iron is inserted in the notch from the top, the latch 82 will be depressed, and if while so depressed the rocker arm 73, is pulled down by the weight 77, thereby tending to rock the shaft 71, and to throw over the hook 81, the pin on the latter will, by striking the arcuate end of the latch prevent the rotation of the shaft, the spring 79, yielding at this time. In these circumstances the finger 84 will be engaged below such pin and the latch member be prevented from again rising until the hook has, by the subsequent lifting of the weight by means of the cam 76, been returned to the normal position shown in Fig. 8.

Located to the left of the standard and below the level of the tray 72 and suitably secured to the bracket 67, is a reject chute 86, which discharges away from the machine, articles falling thereon.

Pivoted on a stub shaft 87 projecting forwardly from the top of the rear member 68 of the bracket 67, is a hood 88, the forward and bottom of which being open, and which is preferably lined with a heat insulating material, such as asbestos. The lower edges of the sides of the hood are slightly above the sides of the tray. A pin 89, projects rearwardly from the tray and engages a vertical slot 90 in the back wall of the hood, which, for this purpose, projects below the sides. It will thus be seen that if the tray be tilted to one side or the other by a proper movement of the shaft 71, the hood will rock on its pivot with such tray. This is shown by the dotted lines in Fig. 10.

With the construction shown, and the parts in the position illustrated in Figs. 7, 8, 9 and 10, if a blow-iron is inserted through the open top of the stripper notch 70, and a bulb and its attached moil are stripped therefrom as before described, the bulb will fall upon the tray. The insertion of the blow-iron will have depressed the latch 82, and the removal of the blow-iron after the moil has been detached will permit such latch to resume its normal position. Upon a downward motion being now imparted to the rocker arm 73 by means of the weight, the tray will be rocked to the right (the hood also partaking of this motion) and the bulb will be delivered to the loader chute 66. If, however, a downward motion be imparted to the rocker arm tending to tilt the tray in the direction to deliver a bulb to the loader chute before the bulb has been stripped from the blow-iron, and while the blow-iron is still in the notch, the hook 81 will be locked against movement by the latch as before described, and thus the tray will not be tilted at this time, but the bulb will remain in the tray until the continued revolution of the cam will disengage the latch 82 from the hook 81 to permit the weight 77 to impart a downward motion to the rocker arm 71 on the following rotation of the cam. If the shaft was permitted to rotate to rock the tray prior to the removal of the blow-iron, the bulb would not be properly delivered to the loader chute.

If the workman after detaching a bulb as before described, sees that it is defective he can, on removing the blow-iron from the stripper notch, immediately strike the end of the hook with the gathering end of the blow-iron, thereby tilting the tray to the left, and causing the detached and defective bulb to be delivered to the reject chute 86.

The loader chute 66, as above stated, is located to the right of the stripping mechanism, and is opposite and normally in the rear of station I. It has its forward end fast to one end of stub shaft 91 mounted in the head of a standard 92 arising from the table. The standard is of sufficient height to locate the shaft above the level of the turret. A rocker arm 93 is sleeved on the opposite end of the shaft and is connected by the pitman 94 with the end of a lever 95, pivoted beneath the table, and adapted to be lifted by a cam 96 on the drive shaft 21. Fast on the end of the shaft 91 is the crank-arm 97, having a pin 98 which projects below the rocker arm 93, and is normally held in contact therewith by a spiral spring 99 encircling the shaft and having its one end fast to the rocker arm, and its other end fast to the knurled washer 100, provided with a series of holes by which the crank arm may be secured thereto in different angular positions.

An arm 101 projects upwardly from the right side of the loader chute and has on the upper end thereof, a stub shaft 102, which projects over the loader chute, at which point there is pivoted on such shaft a paddle 103, the forward end of which is of the design shown in Figs. 1 and 11, and which is normally pressed toward the forward end of the loader chute by a spiral spring 104 around the shaft 102. The purpose of the paddle is to prevent bulbs in the loader chute from being discharged therefrom except when it is desired to do so; while the rear end of the loader chute is closed as shown in Fig. 1, and this prevents the bulbs from discharging rearwardly therefrom. A finger 105 carried on the upper end of a suitable standard 106 which latter is by preference secured to the top of the bracket 92, is so positioned that when the loader chute assumes, due to the rotation of the shaft 91, approximately a vertical position over station I, the rear end of the paddle will contact with such finger and the paddle will thereby be rotated around the shaft 102, and assume the dotted line position shown in Fig. 11.

With the construction shown, and with the loader chute in the position illustrated in Figs. 1 and 11, if a bulb is discharged from the stripper tray by the tilting of the latter to the right as has been described, such bulb will fall into the loader chute, whereupon the rotation of the cam 96 will, through the mechanism before described, tilt the loader chute around the axis of the shaft 91, lifting its rear end. The bulb at the initiation of this movement will be prevented from sliding out of the forward end of the loader chute by the engagement therewith of the paddle. The loader chute will finally be moved to a substantially vertical position above, and in line with the center of station I. The angular position of the cam 96 on the shaft 21 is such that this tilting of the loader chute takes place while the bulb previously loaded is in the position at station I. Immediately before the extremity of the paddle 103 strikes the finger 105, the mechanism for intermittently revolving the turret, causes the bulb previously loaded to be moved to station II. When this takes place the end of the paddle strikes the finger 105 thereby moving the paddle away from the forward end of the loader chute and permitting the bulb to slide out of the lower and forward end of the loader chute into the empty chuck carried by the turret. By properly positioning the finger, the delivery of the bulb to the chuck can be effected without shock. It will be noticed, moreover, that inasmuch as in the stripping, the bulbs are delivered to the stripper tray with their moil ends pointed inwardly toward the center of the machine (forward), and as the bulbs are delivered to the loader chute without being interchanged end for end, the bulbs will be delivered to the loader chute with their moil ends also pointed forwardly and inwardly. Under these conditions the bulbs will be delivered to the chucks of the turret, moil end down.

Figure 14:
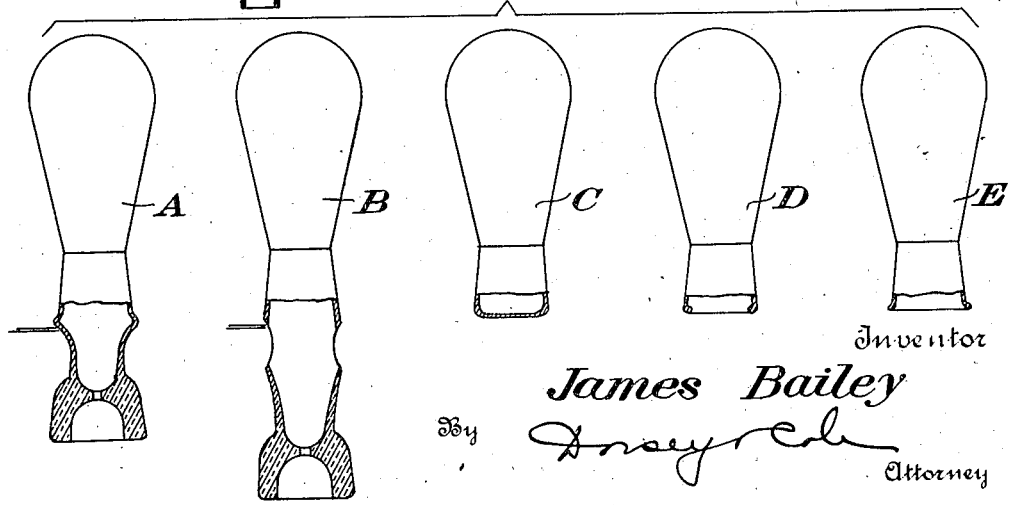
Fig. 14 is a series of views marked A to E, respectively, illustrating successive steps in removing the moil from the bulb and flaring neck after the moil has been removed.

*The moil removing means.* (See Figs. 12, 13 and 14.)

Located beneath the turret at stations I and II are burners 110$^a$ and 110$^b$, respectively, each supported by a suitable bracket 111, which latter is adjustably secured to the top of the table by the clamp screw 111$^a$, and the elevating screws 111$^b$. The burners are so disposed that they each project a flat horizontal sheet of flame at high velocity upon the neck of the bulb held in the chuck at the stations. The bulb at station I may have the general appearance shown at A in Fig. 14. The relation of the drive mechanism for the loading tray to the mechanism for the intermittent rotation of the turret is such, that, after a bulb has been loaded into a chuck at station I, the bulb will not be moved to the next station for an appreciable time. During this period the flame from the burner preheats the neck of the bulb (the bulb being constantly revolving by mechanism previously described) and thus, when the turret is moved forward to the next station, the bulb, having the preheated neck, which formerly was at station I, is moved to station II, where the second burner 110$^b$ is located. A third burner 110$^c$ of similar construction is located at station III.

The table is provided with apertures 115, 116, and 117, each respectively located at stations I, II, and III, (see Fig. 2), and below each aperture are located the discharge chutes 118, 119, 120, respectively. An inclined sheet-metal guard 121 is secured to the top of the table adjacent to stations I and II, and the purpose of this guard is to deflect the broken off particles of glass, which often accumulate adjacent these stations, toward the apertures thereat. The aperture 117 in the table at station III is provided with a sheet metal guard 122 comprising two upstanding side walls, and this guard supports a knife 123 which extends across the aperture 117 immediately to one side of the axial lines of the bulb held at station III.

A burner 112 is located above the turret, and adapted to throw a brush flame around the top of the bulb at station III. A vertical burner 113 is located in the aperture 117 at station III to one side of the knife 123, and is arranged in axial alinement with a bulb held in the turret at such station and designed to project a pointed high velocity flame upwardly into the neck of such bulb.

Surrounding the burner 113 and extending across the aperture 117 beneath the knife 123, is an inverted U-shaped hood 124, which has an opening 125 to permit the flame from the burner to pass upwardly therethrough. Thus when the moil drops off the neck of the bulb at station III, as will be hereinafter described, it will be deflected by the knife 123, and the hood 124, and will therefore not obstruct the passage of the flame from the jet burner 113 as will be readily understood.

When the high velocity flame from burner 110$^b$ strikes the heated zone formed on the neck of the bulb by burner 110$^a$, the glass is further heated until the weight of the moil causes the neck to elongate, as shown by bulb B, (see Figs. 12 and 14). As the neck of the bulb elongates, the thickness of the glass wall at the heated zone decreases and if the bulb is then moved to station III, the high velocity flame from burner 110ᶜ, will puncture the thin wall of the elongated section, and the revolution of the bulb will cause the cut to be carried around the bulb, thus cutting off the portion of the bulb below the flame. During this operation there is a tendency of the glass to contract and thus seal the neck by forming a film across the cut-off point, as illustrated in Fig. 13, and at C in Fig. 14.

It is to destroy this film that the upper burner 112 and the jet-burner 113 are employed. The former heats the air imprisoned in the bulb by the film, and the latter softens and melts such film and aided by the pressure of the heated imprisoned air, punctures it. Under these conditions, it has been found, that the punctured film will retract and gather around the edges of the neck in a slight bead as shown at D in Fig. 14.

The length of the time that the bulbs remain at stations I, II, and III, the amount of heat thrown out by the burners 110ᵃ, 110ᵇ, and 110ᶜ, is such that, under normal conditions, the glass forming the neck of a bulb will be heated to a bright red color while the bulb is at station I; the heated zone of the neck portions of the bulb will be then softened at station II to such an extent that as soon as the bulb reaches station III, the burner 110ᶜ will sever the moil end.

While there has just been described the method by which the excess neck portions of the bulbs are removed under normal conditions it is to be understood, that often these normal conditions do not prevail at the glass factory. Thus, should the bulb be delivered to the turret while it is extremely hot, the burners 110ᵃ and 110ᵇ, at stations I and II, will heat the narrow zone of the neck portion to such an extent, that the moil will drop off at station II, instead of at station III. If this happens, the moil will fall through the aperture 116 and discharge through the chute 119, and the film across the neck of the bulb will be severed at station III as before described.

*The flaring mechanism.* (See Fig. 15.)

The bulb with the waste portion and the moil thus cut off, is then carried by the rotation of the turret to station IV (see Fig. 15) where the edge of the neck, still plastic from the heat to which it has been subjected is reamed by a flarer 127. The flarer consists of a pencil 128 adjustably mounted in the pivoted arm 129, carried upon the upper end of a plunger 130 passing through a suitable bearing 131 in the table 20, and is lifted from time to time by means of a lever 132, actuated by a cam 133 on the shaft 21. By preference the flaring pencil 128 is inclined to the axis of the bulb to be operated upon, and is slightly off-set in respect thereto, so that as it is lifted it enters the neck of the bulb and presses the edge thereof outwardly, causing it to assume the shape shown at E, Fig. 14, the bulb itself being held from displacement during this operation by the chuck. Should the bulbs being blown have very thin walls and a correspondingly small bead on their lower ends, the flaring mechanism as above described is sufficient to properly finish the necks thereof. However, it often occurs that the bulbs being blown have relatively thick walls and larger beads on their necks, and it is then necessary to prevent the bulb from being displaced in the chuck during the upward movement of the flaring pencil. This can be accomplished by providing a roller 134, which is supported by a bracket 135, detachably secured to the top of the table. The roller 134 is shown in its operative position in Fig. 15, and it is to be understood that this device can be removed when it is not needed.

At the conclusion of the flaring operation, the bulb is finished in form so far as glass working in the bulb factory is concerned. The further movement of the turret carries the bulb through station V where it cools, and then to the discharge station VI.

*The mechanism for removing the bulb.* (Figs. 16, 17, 18 and 19.)

A convenient form of automatic transfer mechanism for removing the finished bulb is illustrated in detail in Figs. 16, 17, 18, and 19, and shown in Fig. 1 in plan. This consists of a transfer arm 138, provided at one end with suitable bulb gripper mechanism and with suitable actuating mechanism. The transfer arm 138, is carried on the upper end of a vertical shaft 139, mounted in a standard 140 on the table and said shaft has a cross-head 141 on its lower end below the table; the cross-head being connected with a lever 142 by the pivoted links 143. The lever 142 is actuated by a cam 144 on the shaft 21, in such a manner that the vertical shaft 139 may be raised or lowered. A sleeve 145 is mounted in a bearing in the table and surrounds the shaft 139, the two having a gathered connection 146. The sleeve at its lower end has secured thereto a disk 147, having a crank-pin 148 thereon, on which is journaled one end of a pitman 149, consisting of jointed parts. The other end of the pitman is connected to the lever 150 adapted to be actuated by a cam 151 on the shaft 21, so that as such lever is actuated by the cam the sleeve 145, and with it, the shaft 139 and the arm 138, will be swung through a horizontal arc of approximately 90°. A spring 152 having one end secured to the bottom of the table and its other end secured to the lever 150, tends to retain the lower end of the lever always in engagement with the cam 151. The relation of the cams 144 and 151, is such that, at times the gripper mechanism is above a bulb holder at station VI and is in a lowered position, and is at other times swung away from over the bulb-carrying chuck of the turret in raised position and to a position in which it is desired to drop the bulbs, and is lowered.

The gripper mechanism consists of two semi-circular bands 153—154, the band 154 being carried by a finger 155 rigidly depending from one side of the end of the arm 138. The band 153 is carried on the lower end of the fingers 156, the upper end of such fingers being fast on a shaft 157 extending along the opposite side of the arm 138, and terminating near the shaft 139, in a striker-arm 158, the weight of which tends to hold the band 153 toward the band 154 of the gripper. Projecting from the upper end of the standard 140 and in a position where it will be under the striker arm 158 when the transfer mechanism is in the dropping position before referred to, is a finger 159.

Located beneath the turret at station VI is a lifting pad 160, fast on the upper end of a shaft 161 extending through the table and adapted to be intermittently lifted by a lever 162 and a cam 163 on shaft 21, and to be pulled down by a weight 164, (see Fig. 19). By preference the shaft 161 has its lower end tubular, its bottom being bifurcated to receive the end of the lever 162. Located within the base of the shaft is the compression spring 165, and the follower pin 166, resting on the end of the lever. A stop pin 167 is passed through the lower end of the shaft 161 and retains the several parts in proper relation with each other. Should, during an upward motion being imparted to the shaft by the mechanism previously described, the pad be prevented from being pushed upwardly by reason of a bulb being caught in the chuck, the spring 165 will compress, thus permitting the end of the lever to continue its upward movement without imparting a like movement to the pad 160. However, under normal conditions the lifting pad will function properly and it is only to prevent jamming of the apparatus as a whole that the resilient pad is provided.

With the parts thus located at station VI a chuck with a bulb therein, from which the moil and lower part of the neck has been removed at the previous stations, and is positioned at station VI over pad 160, the pad will be lifted and by contact with the lower end of the bulb, lift the same slightly from the chuck. The arm 138, which at this time is so positioned that the gripper is over such chuck, descends so that the gripper itself presses down on the top of the bulb as the pad is raising the bulb. This results in the band 153 moving away from the band 154 (toward which it is only held by preponderant weight of the striker arm 158), and the bands pass the greater diameter of the bulb. During this action the bulb, as stated, is supported directly from below by the pad 160, and thus the shoulders of the bulb are protected from being injured by the chuck. (Fig. 16, is a view of this portion of the apparatus in the position just described). The bands 153 and 154 of the gripper having passed the larger diameter of the bulb as described, the arm 138 is again lifted. In this action the bulb will be picked up by the gripper because the weight of the bulb is not sufficient to cause the separation of the bands 153 and 154; while the pad will descend to its lower-most position as will be readily understood. After the arm has been lifted sufficiently for the lower end of the bulb to clear the chuck in the turret, the shaft 139 is rotated around its vertical axis by the cam 151 until the gripper is substantially over the discharge position at which time the arm 138 will be lowered (see Fig. 1). In this lowering movement, the striker arm 158 will strike the top of the finger 159, causing a separation of the band 153 from the band 154, thus releasing the bulb which will then drop out of the gripper.

Having thus described my invention what I claim and desire to secure by Letters Patent is,—

1. In a device of the character described, the combination of a member having a stripping notch, a tray located below the notch, means for automatically and periodically rocking the tray, and means rendered operative by the presence of a blow-iron in the notch for nullifying the action of such rocking means.

2. In a device of the character described, the combination of a bulb tray, and automatic resilient means to rock the tray, a member having a stripping notch above the tray, and a latch moved by an insertion of the blow-iron in the stripping action to lock the tray against rocking.

3. In a device of the character described, the combination with a rock shaft, of a rocker arm sleeved thereon and resiliently connected with the shaft, automatic means for periodically rocking the rocker arm, a bulb tray mounted on the shaft, a member having a stripping notch above the tray, and a latch adapted to be moved by a blow-iron in the notch to lock the shaft against rotation in one direction.

4. In a device of the character described, the combination of a member having a stripping notch, a rocking tray mounted below the notch, means for automatically and periodically rocking the tray in one direction, and means operable at will for rocking the tray in the other direction.

5. In a device of the character described, the combination of a member having a stripping notch, a rocking tray mounted below the notch, means for automatically and periodically rocking the tray in one direction, means rendered operative by the presence of a blow-iron in the notch for nullifying the action of such rocking means, and means operable at will for rocking the tray in the other direction.

6. In a device of the character described, the combination of a member having a stripping notch, a rocking tray mounted below the notch, means for automatically and periodically rocking the tray in one direction, a latch moving by the insertion of a blow-iron in the slot to nullify the action of said rocking means, and means for retaining the latch in its shifted position upon the removal of the blow-iron from the slot and during the rocking stroke of said rocking means.

7. In a device of the character described, the combination of a member having a stripping notch, a rocking tray mounted below the notch, means for automatically and periodically rocking the tray in one direction, a latch moving by the insertion of a blow-iron in the slot to nullify the action of said rocking means, and means for retaining the latch in its shifted position upon the removal of the blow-iron from the slot and during the rocking stroke of said rocking means, and operable at will for rocking the tray in the other direction.

8. In a device of the character described, the combination with a rock shaft, of a rocker arm sleeved and resiliently connected with the shaft, automatic means for periodically rocking the rocker arm, a bulb tray mounted on the shaft, a member having a stripping notch above the tray, a hook fast on the shaft and adjacent to the notch, a latch pivoted adjacent to the notch and adapted by the insertion of a blow-iron in the notch to be depressed to arrest the motion of the hook and shaft under the influence of the automatic rocking means, an interlock between the hook and latch whereby the latter will be held depressed if the rocker shaft is partially rocked in one direction during the depression of the latch, and so held until the shaft is rocked in the opposite direction either manually or automatically.

9. In a device of the character described, the combination with a rocking tray, a member having a stripping notch above and adjacent the tray, and a hood pivoted above the tray and connected to the latter to be rocked therewith.

10. In a device of the character described, the combination with a tilting loader chute, of a paddle carried by and pivoted transversely above the loader chute and means located in the path of the opposite end of the paddle when the tray is tilted and adapted to move the paddle away from the bottom of the tray and permit the descent of the article between the two.

11. In a device of the character described, the combination of a gripping mechanism consisting of a pivoted band, an arm capable of lateral motion into two positions and of being raised and lowered in one of such positions and of being lowered in the other position, a shaft mounted on such arm and carrying one of the bands of the gripper, a striker arm on the shaft, and a contact piece adapted to be struck by the striking arm when the gripper-carrying arm is lowered in one of said positions.

12. In a device of the character described, the combination of a transfer mechanism adapted to lift a bulb out of a chuck, of a resiliently supported pad adapted to raise said bulb into gripping engagement with said transfer mechanism.

In testimony whereof I herewith sign my name this 13th day of August, 1919.

JAMES BAILEY.